(No Model.)

H. STORY.
NUT CRACKER AND PICKER.

No. 417,951. Patented Dec. 24, 1889.

WITNESSES:
Alfred Gartner
E. L. Sherman

INVENTOR:
Herbert Story,
BY Draker ATTY'S.

UNITED STATES PATENT OFFICE.

HERBERT STORY, OF KEARNEY, NEW JERSEY.

NUT CRACKER AND PICKER.

SPECIFICATION forming part of Letters Patent No. 417,951, dated December 24, 1889.

Application filed November 12, 1888. Serial No. 290,538. (No model.)

*To all whom it may concern:*

Be it known that I, HERBERT STORY, a citizen of the United States, residing at Kearney, in the county of Hudson and State of New Jersey, have invented certain new and useful Improvements in Nut Crackers and Pickers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to combine a nut-cracker and a nut-pick of a specific construction, so as to produce a useful and convenient article for the table neat in appearance and at a small cost.

The invention consists in the combined nut-cracker and nut-pick hereinafter more fully described, and finally embodied in the claim.

Figure 1:
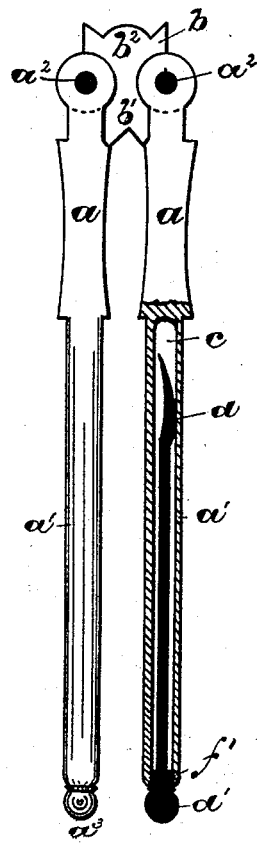
Figure 2:
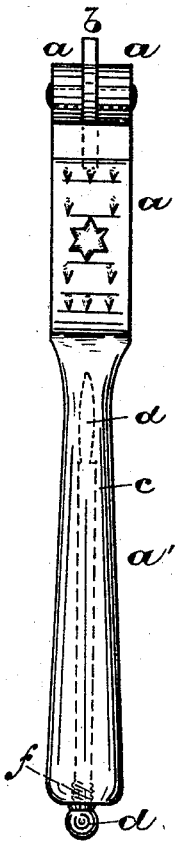

Referring to the accompanying drawings, in which like letters of reference indicate corresponding parts in each of the several figures, Figure 1 is a front view of a combined nut-cracker and nut-pick embodying my improvement, and Fig. 2 is a side view of the same.

In said drawings, $a\,a$ represent the two jaws of a nut-cracker with handles $a'\,a'$, and pivoted at $a^2$ to a variable fulcrum $b$, one portion of said fulcrum $b'$ being arranged for small nuts and the other portion $b^2$ for larger nuts. In one of the handles is formed a deep socket or tube $c$, with threaded openings $f$, adapted to receive and hold a nut-pick $d$, with threaded top $f'$, provided with a projection $d'$ to correspond in appearance with a projection $a^3$ on the other handle, thus giving to the handle a uniform finish.

When the nut-cracker only is to be employed, the nut-pick is allowed to remain in the handle, secured by the screw $f$, where it is out of the way and in no manner interferes with the use of the cracker, and when the nut-pick is wanted for use it may readily and easily be withdrawn from the handle of the nut-cracker by unscrewing, as will be understood. By this arrangement the nut-cracker and nut-pick are always kept together ready for use and much inconvenience is avoided.

I have shown one of the handles socketed or formed with a tube and threaded at its outer end, so as to receive the nut-pick, which I deem more practicable and convenient than implements of somewhat similar character heretofore constructed.

I do not claim, broadly, a combined nut cracker and picker, as such implements, broadly considered, are not new, and I therefore limit myself to the specific features of construction shown and described.

Having thus described my invention, what I claim as new, and desire to secure by Letters Patent, is—

A combined nut cracker and picker consisting of one solid handle and one tubular handle, and a nut-picker inserted in said tubular handle, and a variable fulcrum $b\,b'\,b^2$, pivotally secured to the said handles, said parts being arranged with relation to one another and adapted to operate as described, and for the purposes set forth.

In testimony that I claim the foregoing I have hereunto set my hand this 15th day of September, 1888.

HERBERT STORY.

Witnesses:
OLIVER DRAKE,
E. L. SHERMAN.